United States Patent
Marzen et al.

[11] Patent Number: 5,920,737
[45] Date of Patent: Jul. 6, 1999

[54] PHOTOGRAPH RECORDING AND PLAYBACK DEVICE

[76] Inventors: Michael P. Marzen, 124 S. Fulton St., Allentown, Pa. 18102; Dennis M. Horn, 137 N. Whitfield St., Nazareth, Pa. 18064

[21] Appl. No.: 09/004,160

[22] Filed: Jan. 8, 1998

[51] Int. Cl.⁶ .......................... G03B 29/00; G11B 25/04
[52] U.S. Cl. ................................................ 396/312; 360/2
[58] Field of Search ................................ 396/312; 360/1, 360/2

[56] References Cited

U.S. PATENT DOCUMENTS

| | | | |
|---|---|---|---|
| 4,905,029 | 2/1990 | Kelley | 396/312 |
| 4,983,996 | 1/1991 | Kinoshita | 396/312 |
| 5,128,700 | 7/1992 | Inou et al. | 396/312 |
| 5,276,472 | 1/1994 | Bell et al. | 396/312 |
| 5,521,663 | 5/1996 | Norris, III | 396/312 |
| 5,655,164 | 8/1997 | Tsai | 396/312 |
| 5,845,160 | 12/1998 | Patton | 396/312 |

*Primary Examiner*—W. B. Perkey

[57] ABSTRACT

An apparatus is provided including a housing and an audio transducer mounted on the housing for receiving and transmitting audio signals. A plurality of control buttons include a film button, a playback button, and record button mounted on the housing. A tape recording/applicator mechanism has a tape cartridge compartment for removably receiving a tape cartridge and is adapted to record an audio message from the audio transducer on a portion of the tape of the tape cartridge upon the depression of the record button. The recording/applicator mechanism is further adapted to adhere the portion of the tape to the photograph upon the depression of the film button. Further, a playback mechanism is positioned within the housing for playing back the audio message stored on the portion of the tape of the photograph upon the depression of the playback button.

6 Claims, 3 Drawing Sheets

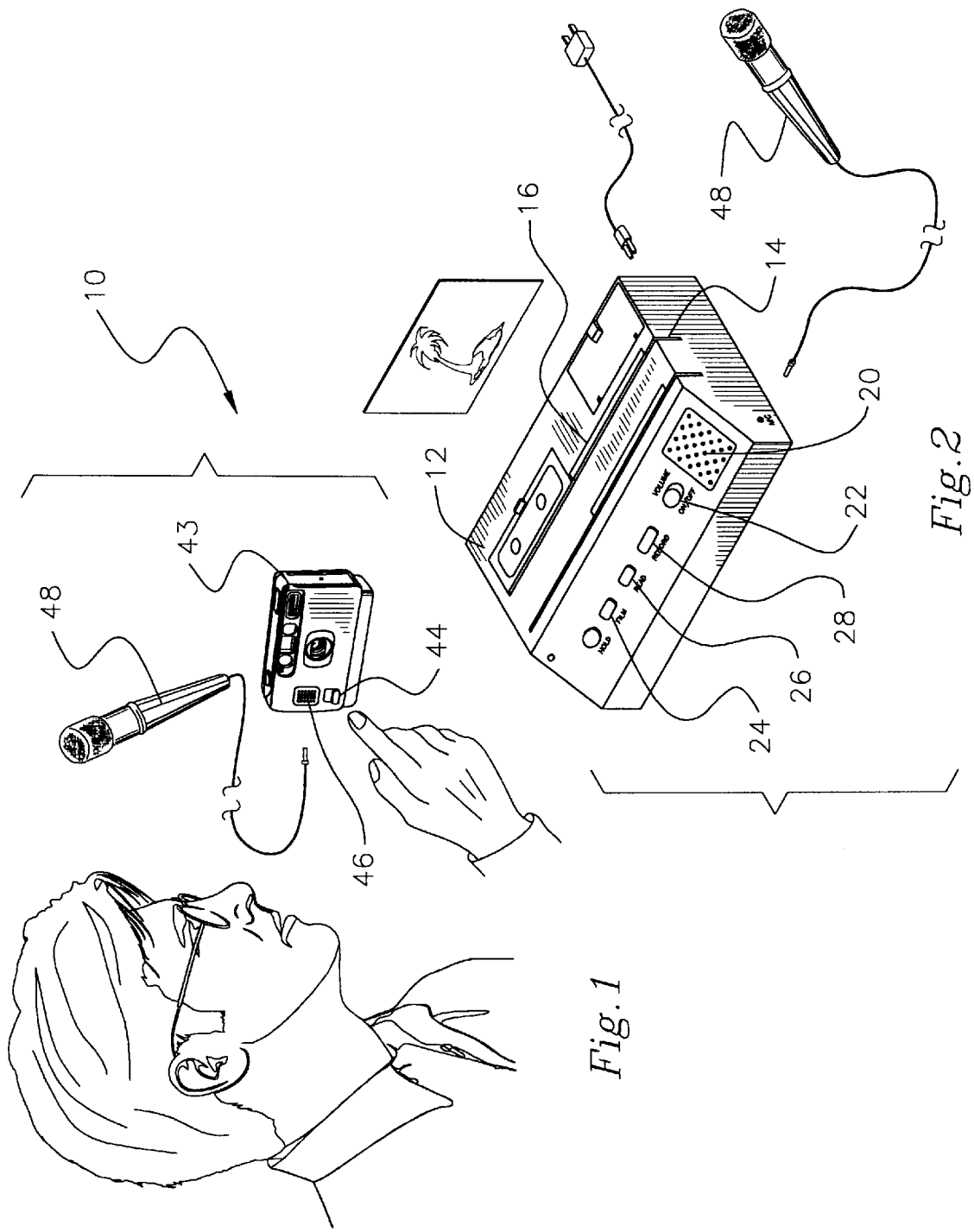

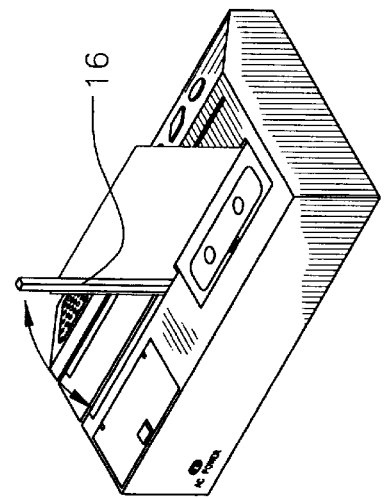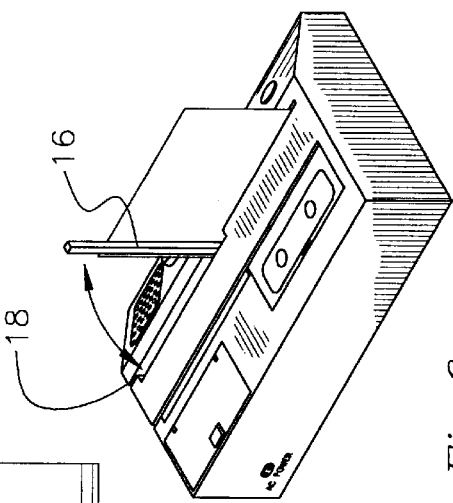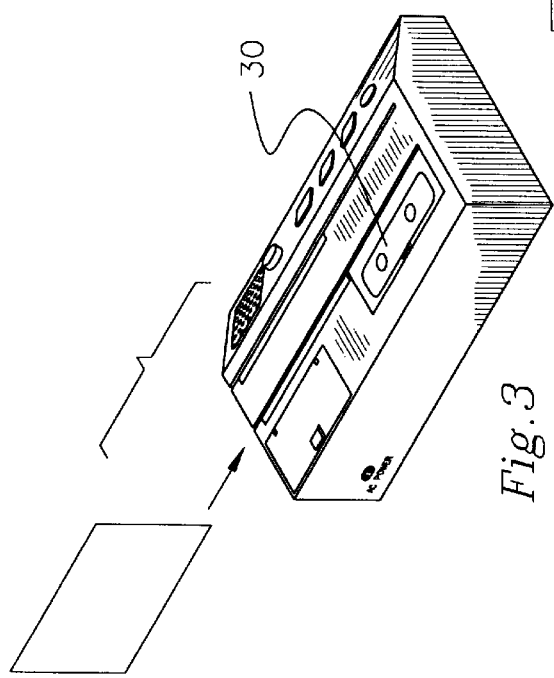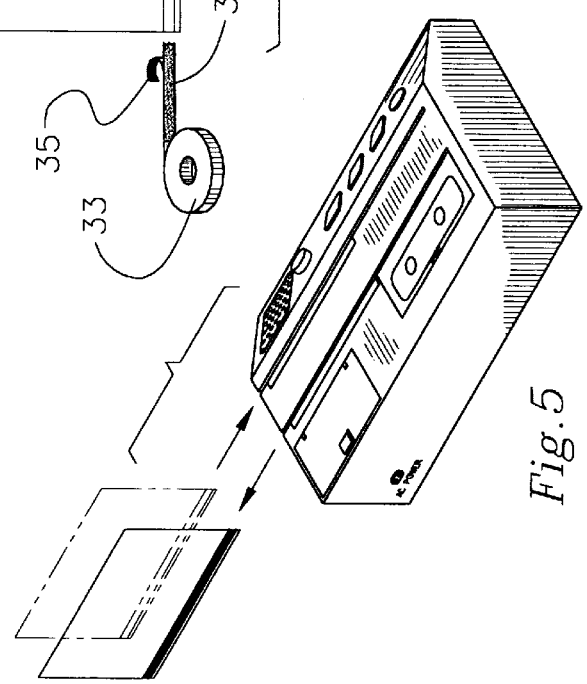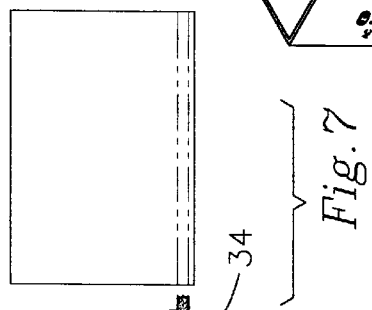

PHOTOGRAPH RECORDING AND PLAYBACK DEVICE

BACKGROUND OF THE INVENTION

1. Field of the Invention

The present invention relates to audio recording cameras and more particularly pertains to a new photograph recording and playback device for retrofitting a recording of an audio message on an existing photograph and further permitting the playback thereof.

2. Description of the Prior Art

The use of audio recording cameras is known in the prior art. More specifically, audio recording cameras heretofore devised and utilized are known to consist basically of familiar, expected and obvious structural configurations, notwithstanding the myriad of designs encompassed by the crowded prior art which have been developed for the fulfillment of countless objectives and requirements.

Known prior art audio recording cameras include U.S. Pat. No. 4,905,029; U.S. Pat. No. 5,276,472; U.S. Pat. No. 5,387,955; U.S. Pat. Des. 334,941; U.S. Pat. No. 5,389,989; and U.S. Pat. No. 5,099,262.

In these respects, the photograph recording and playback device according to the present invention substantially departs from the conventional concepts and designs of the prior art, and in so doing provides an apparatus primarily developed for the purpose of retrofitting a recording of an audio message on an existing photograph and further permitting the playback thereof.

SUMMARY OF THE INVENTION

In view of the foregoing disadvantages inherent in the known types of audio recording cameras now present in the prior art, the present invention provides a new photograph recording and playback device construction wherein the same can be utilized for retrofitting a recording of an audio message on an existing photograph and further permitting the playback thereof.

The general purpose of the present invention, which will be described subsequently in greater detail, is to provide a new photograph recording and playback device apparatus and method which has many of the advantages of the audio recording cameras mentioned heretofore and many novel features that result in a new photograph recording and playback device which is not anticipated, rendered obvious, suggested, or even implied by any of the prior art audio recording cameras, either alone or in any combination thereof.

To attain this, the present invention generally comprises a housing having a top face with a front beveled portion and a rear planar portion, a bottom face and a periphery formed therebetween defining an interior space. The rear planar portion of the top face has a pair of spaced parallel slots formed therein. Each of the slots is equipped with a first end in communication with one side edge of the periphery and a second end terminating short of another side edge of the periphery. FIGS. 4 & 6, show the use of a pair of vertical arms each having a first end coupled adjacent an associated one of the slots at a central extent thereof. During use, each vertical arm has a collapsed orientation within an associated recess and an upright orientation with a surface being in coplanar relationship with the slot. As such, a conventional photograph may be slid within one of the slots and the associated arm raised to maintain the photograph in a vertical orientation. FIG. 2 shows an audio transducer mounted on the front beveled portion of the top face of the housing. The audio transducer is adapted for receiving and transmitting audio signals. Further positioned on the front beveled portion of the top face of the housing is a plurality of control buttons including a film button, a playback button, and record button. Next provided is a magnetic tape recording/applicator mechanism situated within the housing and positioned adjacent the second end of a rear one of the slots. The recording/applicator mechanism has a magnetic tape cartridge compartment for removably receiving a magnetic tape cartridge. The recording/applicator mechanism is adapted to record an audio message from the audio transducer on a portion of the magnetic tape of the magnetic tape cartridge upon the depression of the record button. Upon the depression of the film button, the recording/applicator mechanism is further adapted to adhere the portion of the magnetic tape to a lower rear portion of the photograph. Finally, a linearly translating playback mechanism is situated within the housing and positioned adjacent a front one of the slots. The playback mechanism is adapted for playing back the audio message stored on the portion of the magnetic tape of the photograph upon the depression of the playback button.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new photograph recording and playback device apparatus and method which has many of the advantages of the audio recording cameras mentioned heretofore and many novel features that result in a new photograph recording and playback device which is not anticipated, rendered obvious, suggested, or even implied by any of the prior art audio recording cameras, either alone or in any combination thereof.

It is another object of the present invention to provide a new photograph recording and playback device which may be easily and efficiently manufactured and marketed.

It is a further object of the present invention to provide a new photograph recording and playback device which is of a durable and reliable construction.

An even further object of the present invention is to provide a new photograph recording and playback device which is susceptible of a low cost of manufacture with regard to both materials and labor, and which accordingly is then susceptible of low prices of sale to the consuming public, thereby making such photograph recording and playback device economically available to the buying public.

Still yet another object of the present invention is to provide a new photograph recording and playback device which provides in the apparatuses and methods of the prior art some of the advantages thereof, while simultaneously overcoming some of the disadvantages normally associated therewith.

Still another object of the present invention is to provide a new photograph recording and playback device for retrofitting a recording of an audio message on an existing photograph and further permitting the playback thereof.

Even still another object of the present invention is to provide a new photograph recording and playback device that includes a housing and an audio transducer mounted on the housing for receiving and transmitting audio signals. A plurality of control buttons include a film button, a playback button, and record button mounted on the housing. A tape recording/applicator mechanism has a tape cartridge compartment for removably receiving a tape cartridge and is adapted to record an audio message from the audio transducer on a portion of the tape of the tape cartridge upon the depression of the record button. The recording/applicator mechanism is further adapted to adhere the portion of the tape to the photograph upon the depression of the film button. Further, a playback mechanism is positioned within the housing for playing back the audio message stored on the portion of the tape of the photograph upon the depression of the playback button.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of an optional component of the new photograph recording and playback device according to the present invention.

FIG. 2 is a perspective view of the primary embodiment of the present invention.

FIG. 3 is a perspective view of the present invention during use of the tape recording/applicator mechanism.

FIG. 4 is a perspective view of the vertical arms of the present invention in an erected orientation during use.

FIG. 5 is a perspective view of the photograph of the present invention with the tape adhered thereto.

FIG. 6 is a perspective view of the present invention while the audio message is being played back.

FIG. 7 is a perspective of a portion of the tape cartridge of the present invention.

DESCRIPTION OF THE PREFERRED EMBODIMENT

Figure 8:
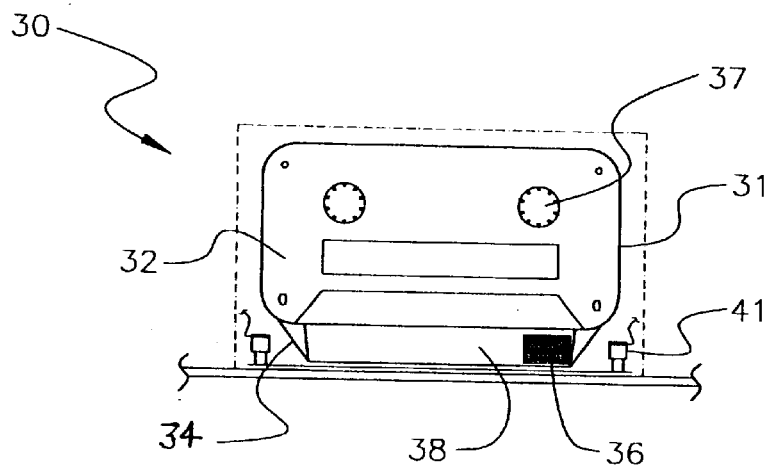
FIG. 8 is a close-up top view of the tape recording/applicator mechanism of the present invention.

With reference now to the drawings, and in particular to FIGS. 1 through 9 thereof, a new photograph recording and playback device embodying the principles and concepts of the present invention and generally designated by the reference numeral 10 will be described.

The present invention, as designated as numeral 10, includes a housing 12 having a top face with a front beveled portion and a rear planar portion, a bottom face and a periphery formed therebetween defining an interior space. The rear planar portion of the top face has a pair of spaced parallel slots 14 formed therein. Each of the slots is equipped with a first end in communication with one side edge of the periphery and a second end terminating short of another side edge of the periphery. For reasons that will become apparent hereinafter, one of the slots is colored and further an unillustrated dust guard is provided for preventing dust from entering therein.

FIGS. 4 & 6, show the use of a pair of vertical arms 16 each having a first end coupled adjacent an associated one of the slots at a central extent thereof. During use, each vertical arm has a collapsed orientation within an associated recess 18 and an upright orientation with a surface being in coplanar relationship with the slot. As such, a conventional photograph may be slid within one of the slots and the associated arm raised to maintain the photograph in a vertical orientation.

FIG. 2 shows an audio transducer 20 mounted on the front beveled portion of the top face of the housing. The audio transducer is adapted for receiving and transmitting audio signals. Associated with the audio transducer is a volume dial 22 for allowing the adjustment of the magnitude of the volume of the audio signals transmitted. Further positioned on the front beveled portion of the top face of the housing is a plurality of control buttons including a film button 24, a playback button 26, and a record button 28.

Next provided is a magnetic tape recording/applicator mechanism 30 situated within the housing and positioned adjacent the second end of a rear one of the slots. The recording/applicator mechanism has a magnetic tape cartridge compartment 31 for removably receiving a magnetic tape cartridge 32. It should be noted that the magnetic tape 33 of the magnetic tape cartridge includes a thin flexible plastic backing 34 with a magnetic strip 35 having adhesive on one side with a non-adhesive side being in abutment with the plastic backing when the magnetic tape is rolled at the time of manufacture.

During use, the recording/applicator mechanism is adapted to record an audio message from the audio transducer on a portion of the magnetic tape of the magnetic tape cartridge upon the depression of the record button. To accomplish this, a recording head 36 is mounted adjacent the slot in sliding abutment with the plastic backing of the tape.

When the record button is depressed, a reel 37 dispenses the magnetic tape past the recording head for a length equal to the photograph. While the tape is reeled, the magnetic tape transfers the audio signals from the audio transducer through the plastic backing to the magnetic strip. The photograph is then inserted within the appropriate slot.

Upon the depression of the film button, the recording/applicator mechanism is further adapted to adhere the portion of the magnetic tape to a lower rear portion of the photograph. To achieve this, an elongated plunger 38, which has the recording head mounted thereon, presses the recorded portion of the magnetic tape against the photograph. Since the magnetic strip of the magnetic tape is very delicate and the amount of force applied by the plunger is great, the coupling between the adhesive and photograph effects the severing of the magnetic tape at each end thereof.

A linearly translating playback mechanism 40 is situated within the housing and positioned adjacent a front one of the slots. The playback mechanism is adapted for playing back the audio message stored on the magnetic tape of the photograph upon the depression of the playback button. It should be noted that in the present invention, the magnetic playback head must move as opposed to the tape moving. This may be accomplished via a reciprocating belt or the like.

Figure 9:
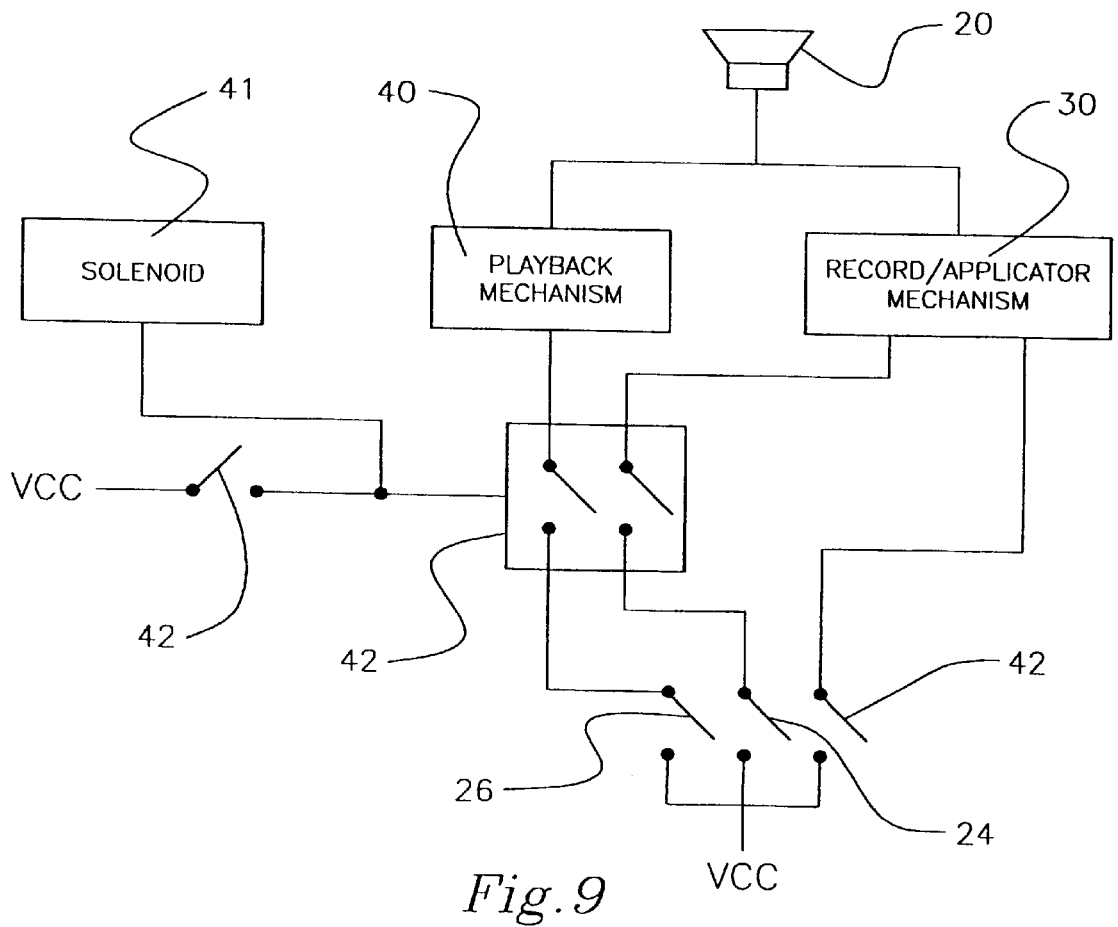
FIG. 9 is a schematic diagram of the various components of the present invention.

As shown in FIG. 8, the tape recording/applicator mechanism may include a pair of solenoids 41 which, when actuated, abut the photograph against an opposing wall of the slot. This maintains the photograph in place during use. It should be noted that the solenoids are only actuated upon the depression of a hold button 42. As shown in FIG. 9, the various buttons are configured such that the tape recording/applicator mechanism can not be actuated without first depressing the hold button. It should be understood that the foregoing solenoid assembly principles may further be applied to the playback mechanism.

In an alternate embodiment, as shown in FIG. 1, a camera 43 may be included as an additional accessory. The camera includes a recording compartment in which a magnetic tape cartridge may be removably inserted. The camera is further equipped with an actuator button 44 and a microphone 46 connected to a recording mechanism associated with the recording compartment. During use, the user may depress the actuator button for storing on a portion of the magnetic tape cartridge an audio message via the microphone. In all of the embodiments, a jack is included for releasably connecting with a stand alone hand-held microphone 48. It should be noted that the camera serves as an additional means of recording tape which can be used when the picture is being taken, a critical feature.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An apparatus for retrofitting a recorded audio message onto an existing photograph and further playing back the same comprising, in combination:

a housing having a top face with a front beveled portion and a rear planar portion, a bottom face and a periphery formed therebetween defining an interior space, the rear planar portion of the top face having a pair of spaced parallel slots formed therein each with a first end in communication with one side edge of the periphery and a second end terminating short of another side edge of the periphery;

a pair of vertical arms each having a first end coupled adjacent an associated one of the slots at a central extent thereof, wherein each vertical arm has a collapsed orientation within an associated recess and an upright orientation with a surface being in coplanar relationship with the slot, whereby a conventional photograph may be slid within one of the slots and the associated arm raised to maintain the photograph in a vertical orientation;

an audio transducer mounted on the front beveled portion of the top face of the housing for receiving and transmitting audio signals;

a plurality of control buttons including a film button, a playback button, and record button mounted on the front beveled portion of the top face of the housing;

a magnetic tape recording/applicator mechanism situated within the housing and positioned adjacent the second end of a rear one of the slots, the recording/applicator mechanism having a magnetic tape cartridge compartment for removably receiving a magnetic tape cartridge and adapted to record an audio message from the audio transducer on a portion of the magnetic tape of the magnetic tape cartridge upon the depression of the record button, the recording/applicator mechanism further adapted to adhere the portion of the magnetic tape to a lower rear portion of the photograph upon the depression of the film button; and a linearly translating playback mechanism situated within the housing and positioned adjacent a front one of the slots for playing back the audio message stored on the portion of the magnetic tape of the photograph upon the depression of the playback button.

2. An apparatus for retrofitting a recorded audio message onto an existing photograph and further playing back the same comprising:

a housing;

an audio transducer mounted on the housing for receiving and transmitting audio signals;

a plurality of control buttons including a film button, a playback button, and record button mounted on the housing;

a tape recording/applicator mechanism situated within the housing, the recording/applicator mechanism having a tape cartridge compartment for removably receiving a tape cartridge and adapted to record an audio message from the audio transducer on a portion of the tape of the tape cartridge upon the depression of the record button, the recording/applicator mechanism further adapted to adhere the portion of the tape to the photograph upon the depression of the film button; and a playback mechanism situated within the housing for playing back the audio message stored on the portion of the tape of the photograph upon the depression of the playback button.

3. An apparatus as set forth in claim 2 wherein the recording/applicator mechanism is adapted to adhere the portion of the tape to a lower rear portion of the photograph.

4. An apparatus as set forth in claim 2 wherein the housing has a pair of spaced parallel slots.

5. An apparatus as set forth in claim 4 wherein a pair of vertical arms each having a first end coupled adjacent an associated one of the slots, wherein each vertical arm has a collapsed orientation and an upright orientation, whereby a conventional photograph may be slid within one of the slots and the associated arm raised to maintain the photograph in a vertical orientation.

6. An apparatus as set forth in claim 2 and further including a camera with a recording mechanism for recording an audio message on the tape cartridge.

* * * * *